United States Patent [19]

Magnus

[11] 4,296,781
[45] Oct. 27, 1981

[54] SECTIONAL PIPE AND TUBULAR MEMBERS FOR FORMING SAME

[75] Inventor: Paul G. Magnus, Apple Valley, Minn.

[73] Assignee: Magnusystem, Inc., Apple Valley, Minn.

[21] Appl. No.: 32,249

[22] Filed: Apr. 23, 1979

[51] Int. Cl.³ .................... F16L 9/22; E04H 12/18
[52] U.S. Cl. ................................ 138/155; 138/157; 138/166; 138/168
[58] Field of Search .............. 138/155, 157, 162, 166, 138/168

[56] References Cited

U.S. PATENT DOCUMENTS

| | | | |
|---|---|---|---|
| 3,126,035 | 3/1964 | Espetvedt | 138/162 |
| 3,242,576 | 3/1966 | Wheeler | 138/157 |
| 3,360,894 | 1/1968 | Sharman et al. | 138/166 |
| 3,583,424 | 6/1971 | Bryant | 138/166 |
| 3,693,664 | 9/1972 | Schmunk | 138/155 |
| 3,805,462 | 4/1974 | Caperton | 138/155 |

*Primary Examiner*—Steven L. Stephan
*Attorney, Agent, or Firm*—Merchant, Gould, Smith, Edell, Welter & Schmidt

[57] ABSTRACT

An elongated sectional pipe 50 is formed from a plurality of tubular members 2 connected together end to end. Each tubular member 2 comprises three sections 6-8 each having a plurality of longitudinally staggered lugs 22-24. The lugs 22-24 have curved locking surfaces 26 and 28 to allow the sections 6-8 to be snapped together. A pipe 50 may be formed by consecutively snapping a plurality of tubular members 2 together from their disassembled sections 6-8 while simultaneously coupling the tubular members 2 together end to end. Conversely, the pipe 50 can be disassembled by directing the tubular members 2 one by one against a disassembly tool 60 which splits each tubular member 2 apart into its individual sections 6-8.

16 Claims, 7 Drawing Figures

SECTIONAL PIPE AND TUBULAR MEMBERS FOR FORMING SAME

TECHNICAL FIELD

This invention relates in general to an improved sectional pipe made from a plurality of tubular members which are connected together end-to-end. Each tubular member is itself made from a plurality of sections that are releasably engaged together. The sectional pipe and tubular members of the present invention do not relate, as such, to any particular field of industry. Rather, they have wide utility in many different fields of industry wherever elongated pipes or tubes are used. For example, this invention has application to oil well drilling equipment, machinery which incorporates extensible and retractable booms, and other diverse implements.

DESCRIPTION OF THE PRIOR ART

Elongated pipes are used in many different engineering applications. For example, pipes are used to carry water, oil, or other flowable liquid or semi-liquid products. Pipes or conduits are often used to house and cover utility lines, telephone cables, and other elements which must be protected from the vagaries of wind and weather. In an even broader sense, pipes are nothing more than columns which are used as support members in building construction and in various diverse equipment. For example, movable vehicles are known which have a hydraulically operated extensible and retractable boom. The boom carries a basket or support platform at one end on which a person can stand. As the boom is extended or retracted, the person on the support platform is elevated and lowered to work on overhead utility lines, rescue people from buildings, etc. It should be apparent that an elongated pipe is a mechanical component of such widespread utility that it would be virtually impossible to list here all of the various applications in which it is or could be used.

Elongated pipes, such as those used in pipe lines or in the drill strings or casings of underground wells, often extend great distances. In this type of installation, the pipe is usually made up of a plurality of pipe sections laid end-to-end and secured together. For ease of installation and to minimize the number of joint connections in the pipe, the pipe sections from which the pipe is constructed are made as long as possible. Pipe sections many feet long, e.g. twenty to thirty feet or more, have been used in various applications. In addition, each of the pipe sections generally has been formed as a unitary piece or member which is cast or otherwise formed in any conventional process.

The prior art pipe sections have a number of disadvantages. Because these sections may be relatively long and often quite heavy, they can be bulky and difficult to handle. The longer and heavier a pipe section is, the more complex must be the supporting equipment used to support and guide the section during installation into the pipe. For example, oil well drilling equipment customarily includes a tower or derrick in which the pipe sections are individually handled as they are placed into the well. This tower or derrick is quite high when the pipe sections are themselves relatively long. In addition, the equipment which is used to grapple and maneuver the pipe sections must be engineered to a level which is capable of handling these sections carefully and safely. This increases the cost of the pipe handling equipment accordingly.

Another disadvantage with relatively long pipe sections is that they exhibit less flexibility in terms of custom designing the length of the pipe to a particular installation. This is because the pipe is usually laid out so as to be constructed from whole and uncut pipe sections. It is relatively expensive to cut pipe sections and often is not economical to do so. Thus, when the pipe sections which are used to form the pipe are relatively long, the length of the pipe can usually be adjusted in increments which correspond only to the length of the pipe section. When this length is quite long, it may be very difficult to custom tailor the pipe to fit a pre-determined space in a particular installation.

It has been proposed in the past that elongated pipes or conduits be made from a plurality of sections which are interlocked together. This partially negates the need for relatively long individual pipe sections. Many of these sectional pipes disclose various interlocking lugs for holding together discrete circumferential sections of the pipe. Often, the lugs extend circumferentially from one pipe section into the thickness or edge of an adjacent section to join the pipe sections together in a side-by-side manner. For example, see U.S. Pat. No. 1,430,094 to Meier. However, the lugs in many of these devices do not themselves lock the pipe sections together. An additional coupling means is often used to affirmatively hold the sections together. For example, Meier discloses that the sections of the pipe be held together by concrete which is poured into the sections to interlock the lugs. Insofar as these devices require both interlocking lugs and means for coupling the lugs, they are complex and time consuming to assemble.

U.S. Pat. No. 3,213,573 to Bohr et al discloses an extensible and retractable member which is different from a conventional sectional pipe. In the Bohr device, a plurality of metallic or plastic strips are arranged to form a triangular boom having dove-tailed interlocking joints along their mating edges. The strips are flexible and can be rolled up onto support drums. These drums, however, can be rotated to dispense the strips together to an assembly point. The dove-tailed joints are interengaged or "zippered together" at the assembly point to form a rigid boom. This boom will grow in length as the strips are progressively fed out from their support drums. The Bohr device represents a different approach to the problem of assembling an elongated pipe or boom. However, the use of thin and flexible strips to form the boom presents certain difficulties. For example, in order for the strips to be sufficiently flexible to allow them to be rolled onto support drums, they must be relatively thin which lessens their structural strength. It is not believed by Applicant that the device proposed in Bohr would have sufficient strength in many applications where elongated pipes and booms are required.

U.S. Pat. No. 3,693,664 to Schmunk discloses a sectional conduit in which the various sections of the conduit are simply snapped together. Each section of the conduit is formed as an enclosed member having longitudinally spaced corrugations on a peripheral surface thereof. The corrugations are shaped to be snapped together so that the peripheral surface of one conduit may be engaged on the peripheral surface of an adjacent conduit. However, the Schmunk device is unacceptable in any application where the peripheral surface of the pipe must be smooth since the peripheral surface in Schmunk forms corrugations which allow the sections to be interlocked together.

SUMMARY OF THE INVENTION

This invention relates to an improved sectional pipe which is made from a plurality of tubular members that are connected together end-to-end. One aspect of this invention is a novel tubular member used to form the pipe. The tubular member is formed from a plurality of sections which may be quickly and easily interlocked together.

Each tubular member is formed from a plurality of circumferential sections. Each section includes a circumferential surface, two radially extending side surfaces, and an inner axial surface that runs along and closely adjacent to a longitudinal axis through the tubular member. Each axial surface of each section has a plurality of inwardly extending lugs. The lugs are radially curved and staggered relative to one another such that the sections can be detachably snapped together with the lugs serving to interlock the sections.

This invention also includes a preferred method of assembling and disassembling a sectional pipe made from a plurality of the tubular members. The separate sections which form the tubular members are divided into groups of identical sections. The sections are then fed to a common assembly point where they are snapped together to form a completed tubular member. The tubular member is then moved longitudinally away from the assembly point while the sections of the next tubular member are fed to the assembly point. The sections of this tubular member are engaged on one end of the completed preceeding tubular member and are then snapped together as the longitudinal movement of the tubular member continues. This process is then repeated to join as many tubular members together as desired to form a sectional pipe of a particular length. In a reverse operation, the pipe can be disassembled by splitting apart the sections of each tubular member and then conducting the individual sections away from the point of disassembly.

BRIEF DESCRIPTION OF THE DRAWINGS

This invention will be described hereafter in the Detailed Description, when taken in conjunction with the following drawings, in which like reference numerals will refer to like elements throughout.

DETAILED DESCRIPTION

Referring first to FIGS. 3–6, a longitudinally elongated tubular member according to this invention is generally illustrated as 2. Tubular member 2 is preferably a cylinder which is symmetrical about a longitudinal axis 4 that extends through the center of the cylinder. The exact shape of tubular member 2 is however not critical to the present invention. For example, tubular member 4 could have shapes other than a cylindrical one including a square, rectangular, or triangular cross-section.

Tubular member 2 itself forms an elongated pipe of general utility. By that, it is meant that tubular member 2 if long enough could itself form a complete pipe or column which may be used in any manner or installation where such pipes or columns are conventionally required. However, tubular member 2 will preferably form but one section of a much longer sectional pipe that is formed from a plurality of tubular members 2 which are placed and connected together end-to-end. A preferred method and apparatus for accomplishing the assembling and disassembling of a sectional pipe formed from the tubular members 2 will be discussed in more detail hereafter. For the moment, a single tubular member 2 will be described in detail with it being understood that the other tubular members are formed generally identically with the tubular member that will be described.

Figure 3:
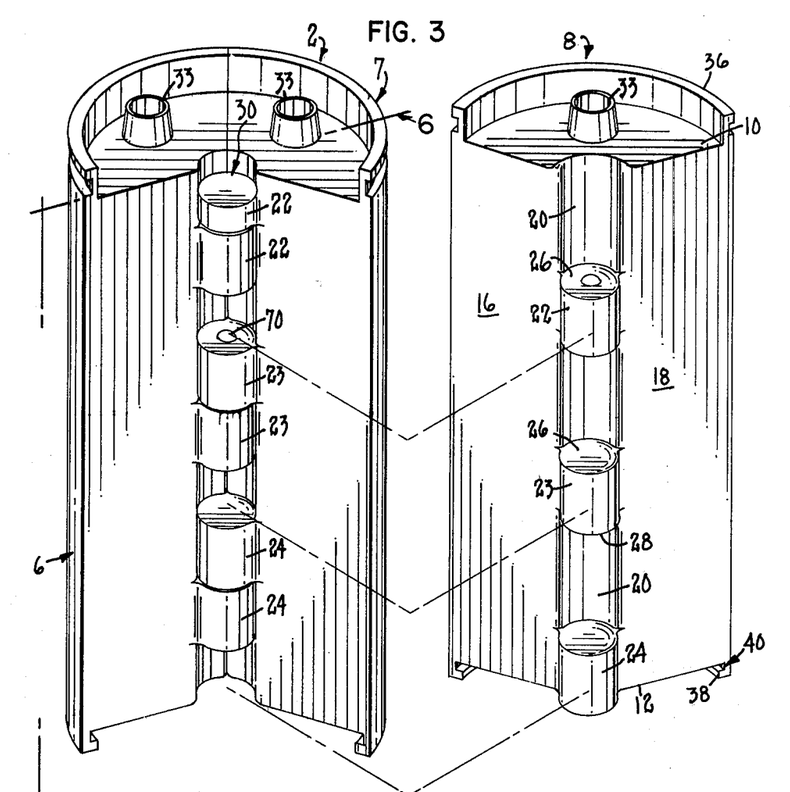
FIG. 3 is a perspective view of an elongated tubular member according to this invention, with FIG. 3 being partially exploded to particularly illustrate the sections which are joined together to form the tubular member.
Figure 4:
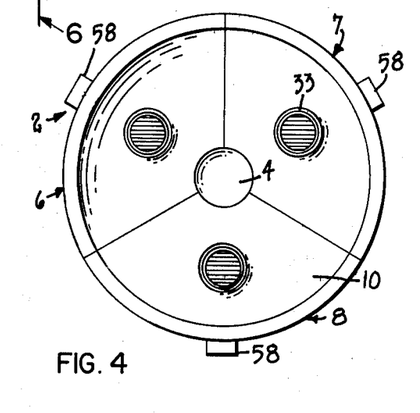
FIG. 4 is a top elevational view of the tubular member of FIG. 3.
Figure 5:
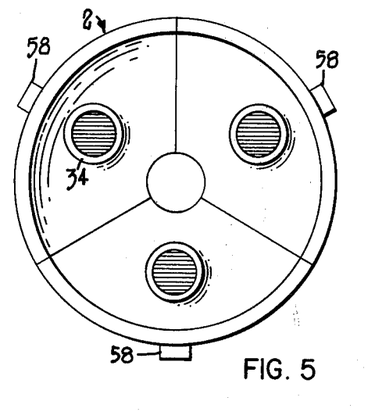
FIG. 5 is a bottom elevational view of the tubular member of FIG. 3.

Tubular member 2 is formed from three separate sections 6, 7 and 8 which will be interlocked with one another. Each of the sections 6-8 are generally identical although there are a number of specific differences between the sections which will be noted hereafter. Referring now to FIG. 3, the section 8 is shown broken out of tubular member 2 for the sake of clarity. The following description of section 8 will also apply to describe sections 6 and 7 except for any specifically noted differences and with identical reference numerals being used with regard to all three sections 6-8 to denote identical components.

The section 8 comprises a longitudinally elongated body having two longitudinally spaced parallel top and bottom surfaces 10 and 12 which intersect the longitudinal axis 4 to define the opposed ends of section 8. A typical cross-sectional configuration through section 8, in a plane which is parallel to the surfaces 10 and 12, includes a circumferential surface 14. Circumferential surface 14 will form a portion of the exterior periphery of the tubular member 2 when the sections 6-8 are joined together. In addition, the cross-sectional configuration of section 8 includes two radially extending side surfaces 16 and 18. Side surfaces 16 and 18 converge inwardly from the circumferential surface 14. However, the side surfaces 16 and 18 do not come together to a point, but rather terminate in an arcuate axially extending surface 20. Axial surface 20 is parallel to but slightly spaced from the longitudinal axis 4 which runs through the center of tubular member 2. Axial surface 20 forms part of a circle, e.g. 120° of arc of the circle, which is centered around longitudinal axis 4.

Figure 6:
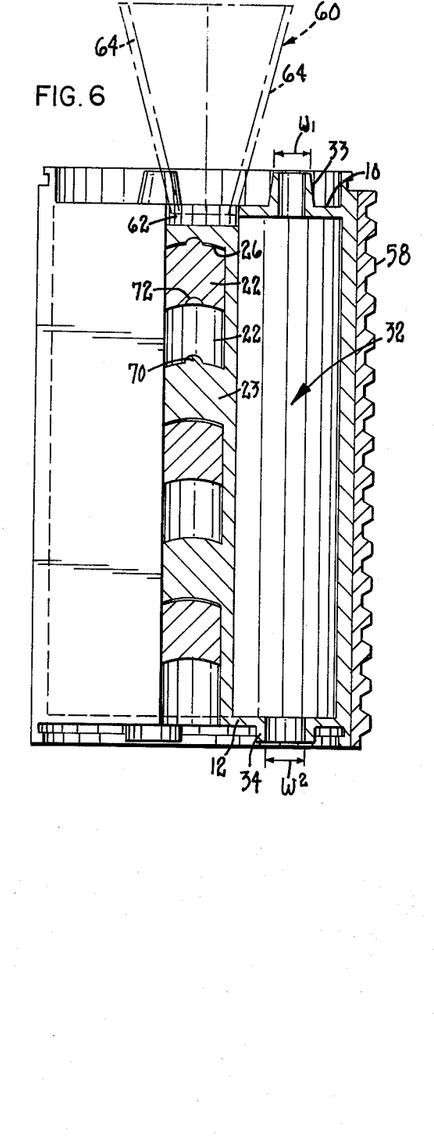
FIG. 6 is a partial cross-sectional view showing an apparatus for and method of disassembling an elongated tubular member of the present invention into its individual sections.

The section 8 includes a plurality of, e.g. three, radially extending locking lugs 22, 23 and 24. Locking lugs 22–24 extend inwardly from the axial surface 20 of section 8 and are circularly shaped to fit inside the circle which is formed by the axial surfaces 20 of all three sections 6–8. See FIG. 4. The center of the locking lugs 22–24 lies along the longitudinal axis 4 of tubular member 2. In addition, the locking lugs 22–24 are longitudinally spaced along the axial surface 20. In effect, locking lug 22 might be thought of as defining a top lug, locking lug 23 a middle lug, and locking lug 24 a bottom lug. Furthermore, as shown in FIGS. 3 and 6, the locking lugs 22–24 each have top and bottom surfaces which may be respectively referred to as 26 and 28. Each of these surfaces 26 and 28 are radially curved to define a locking surface for holding the sections 6–8 together as described in more detail hereafter.

Each of the sections 6–8 are generally identical except that the orientation of locking lugs 22–24 will be different between the different sections 6–8. Each section 6–8 includes three longitudinally spaced locking lugs 22–24 so the same reference numerals have been used to apply to the locking lugs on each section. However, the locking lugs on the sections 6–8 are longitudinally staggered relative to one another so they will interfit with one another. When the locking lugs 22–24 on the three sections 6–8 are interfitted together as shown in FIGS. 3 and 6, they colinearly lock the sections together along the longitudinal axis 4. The only other difference in the locking lugs is that the very topmost locking lug 22, i.e. the locking lug 22 shown on section 6, is less thick than the other lugs 22 to be recessed below the top surface 10 of section 6. Thus, the tubular member 2 formed from the sections 6–8 will have a chamber or space 30 located in top surface 10 at the location of longitudinal axis 4. The purpose of chamber 30 will be described hereafter.

The locking lugs 22–24 are shaped so that the lugs 22–24 will be engaged with one another in a snap type fit. In this regard, the curvature of the locking surfaces 26 and 28 on the lugs 22–24 is important. For one thing, the locking surfaces 26 and 28 on adjacent ones of the lugs 22–24 must have a curvature which match one another to allow the lugs to be properly interfitted together. In addition, the curvature of the surfaces 26 and 28 will be greater near the lugs adjacent the bottom surface 12 of the tubular member 2 and will progressively decrease as one goes towards top surface 10. In other words, the curvature of the surfaces 26 and 28 on the top lugs 22 is less than the curvature for the bottom lugs 24 with the middle lugs 23 having an intermediate degree of curvature. Preferably, the top surface 26 has a concave curvature with the bottom surface 28 of each lug having a convex curvature to match the curvature of the surface 26 of an adjacent locking lug.

The above-noted orientation of locking lugs 22–24 allows the three separate sections 6–8 of the tubular member 2 to be longitudinally tilted outwardly relative to one another, generally like the leaves of a slightly opened tulip. The three bottom lugs 24 on sections 6–8 can then be slightly engaged with one another with the upper lugs 22 and 23 being spaced from one another. If an external force is then applied to sections 6–8 causing the sections 6–8 to be pressed together or straightened up from their tilted orientation, like the closing of the tulip leaves, all the lugs 22–24 will be progressively forced into their respective aligned positions shown in FIG. 6 beginning with the bottom lugs 24 and proceeding towards the top. This engagement will occur very fast since the lugs 22–24 will in effect snap together. The curvature of the locking surfaces 26 and 28 on the lugs is selected so as not to be so great that the lugs cannot be interfitted, but, once interfitted, the curvature of the locking lugs prevents the sections from being laterally disengaged under the normal forces encountered during operation of the tubular member. Longitudinal movement between the assembled sections 6–8 is prevented by the interengagement of the staggered lugs 22–24 on the different sections 6–8. Once snapped together as noted above, the sections 6–8 will form a completed tubular member 2.

In addition, the section 8 includes an elongated conduit or passageway 32 which is formed therein. See FIG. 6. Conduit 32 extends through the entire length of section 8 and includes means on the opposed ends thereof for coupling conduits 32 in longitudinally adjacent sections together. The coupling means comprises two, outwardly extending nipple members 33 and 34 which fluidically communicate with conduit 32 and which project respectively outwardly from the top and bottom surfaces 10 and 12 of section 8. The nipple members 33 and 34 together are conventional coupling members of the male and female type. In other words, nipple member 33 has a width $w^1$ at its outer end which is slightly less than the width $w^2$ of the circular opening in nipple member 34. Thus, a nipple member 33 on the one end of a first section 8 can be received inside the opening in the nipple member 34 on the section 8 of an adjacent tubular member. Thus, the conduits 32 in longitudinally adjacent tubular members can be connected together when the tubular members are connected together to form a continuous passageway through the tubular members. In addition, each of the sections 6 and 7 include a similar conduit and nipple member structure. However, if desired, only the section 8 could be provided with a conduit and nipple structure.

Figure 7:
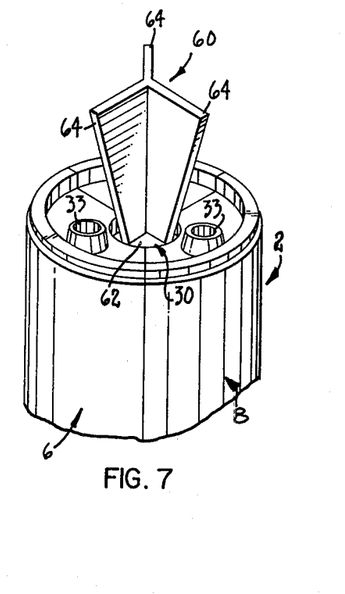
FIG. 7 is a partial perspective view of the apparatus and method shown in FIG. 6.

In addition, each of the tubular members formed by the sections 6–8 include a coupling means for connecting together in an end-to-end manner longitudinally adjacent tubular members. The coupling means includes an outwardly turned lip generally designated as 36 located at one end of each section 6–8. The lip sections 36 on each of the sections 6–8 will form a complete annular lip as shown in FIG. 7 when the sections 6–8 are coupled together. In addition, the coupling means for the tubular members further includes an inwardly turned shoulder generally indicated as 38 at the opposed end of each section. The lip 36 and shoulder 38 are sized so that the lip can be received in the recess 40 defined by the shoulder to longitudinally couple one tubular member 2 to an adjacent tubular member as will be described in more detail hereafter.

Figures 1, 2:
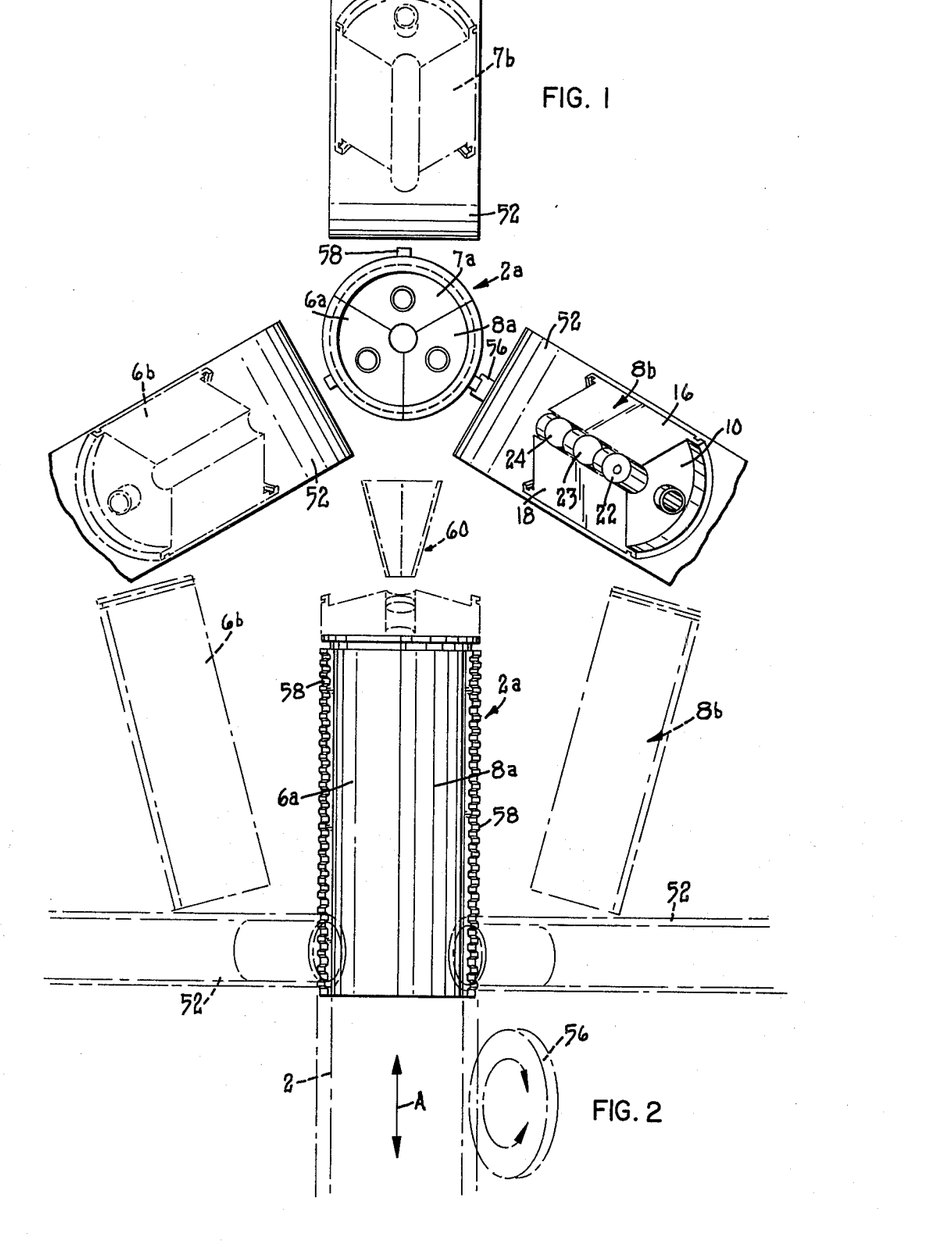
FIG. 1 is a top elevational view of an apparatus for practicing a method according to this invention of assembling a plurality of identical tubular members together to form an elongated sectional pipe.
FIG. 2 is a front elevational view of the apparatus and method illustrated in FIG. 1.

As mentioned previously, it is generally preferred that the tubular members 2 be connected together in an end-to-end relationship to form an elongated sectional pipe. An apparatus and a method for accomplishing such an operation is illustrated in FIGS. 1 and 2. In these figures, the sectional pipe being formed is generally illustrated as 50. Pipe 50 is formed from a plurality of tubular members designated as 2, 2a, etc. The tubular members 2, 2a, etc. are, of course, formed from a plurality of sections which will also use a corresponding numeral and letter designation, i.e. 6, 7 and 8; 6a, 7a, and 8a, and so on.

Referring to FIGS. 1 and 2, the sections 6–8 of each of the tubular members are originally disassembled and divided into three groups. One group will contain all of the sections designated as 6 having one orientation of the locking lugs and the sections 7 and 8 will be contained in the other groups. Each group of the sections 6–8 is disposed on a belt conveyor generally indicated as 52. The three belt conveyors are arranged to have their discharge ends 53 located proximately to an assembly point at which the sections 6–8 will be snapped together. Thus, the conveyors will transport the sections 6–8 in a horizontal plane towards a common assembly point. Preferably, the sections 6–8 are conveyed towards the assembly point in a longitudinally tilted orientation on the belt conveyors 52 corresponding to the orientation in which they can have the bottom lugs 24 engaged prior to snapping the sections 6–8 together. Sections 6–8 may be maintained in this tilted orientation on conveyors 52 by virtue of suitable slats or support structure (not shown) on the conveyors 52 which engages and supports the bottom end of each section 6–8. Although belt conveyors 62 have been shown as one means for transporting the sections 6–8 to the assembly point, any other suitable transport means could be used.

Mounted beneath the assembly point and the belt conveyors 52 is a platform (not shown) which supports at least one drive motor (not shown) having at least one toothed drive pinion 56. Each of the sections 6–8 which forms a tubular member includes along its exterior surface an elongated longitudinally extending toothed rack 58. The teeth of rack 58 have the same pitch as the teeth on drive pinion 56 so as to mate therewith. The drive pinion 56 serves as a means for moving an assembled tubular member 2, 2a, etc. in a longitudinal direction away from the assembly point as described hereafter. Although only one drive pinion 56 has been shown, an identical drive pinion 56 could be provided for engagement with the racks 58 on each of the sections 6–8. All three drive pinions 56 could in this event be driven by the same drive motor using any appropriate drive transmission for connecting the drive pinions together. Alternatively, only one drive pinion 56 could be used to drive pipe 50. In this latter event, undriven pinions could engage the racks 58 of the other sections to provide support and guidance for the pipe during its longitudinal movement. The longitudinal movement of pipe 50 will occur in the direction of arrow A in FIG. 2 which is 90° offset from the movement of the unassembled sections 6–8 on the conveyors 52.

In a preferred manner of operation of the apparatus shown in FIGS. 1 and 2, the separate sections 6–8 of the tubular members 2, 2a, etc. are moved simultaneously towards the assembly point on the conveyors 52. A control means (not shown) is provided for synchronizing movement of the conveyors 52 not only with respect to each other but with respect to operation of drive pinion 56. This control means may have any suitable form and may comprise an electronic computer for controlling the operation of the drive motors of these components. In any event, conveyors 52 are controlled so that the three sections 6–8 of any given tubular member 2 arrive at the assembly point at the same time. Assuming that a first tubular member 52 has already been formed (e.g., by manually snapping the sections together at the assembly point), that tubular member 2 is being driven downwardly in the longitudinal direction by the drive pinion 8.

Operation of the drive pinion 56 is synchronized with operation of the conveyors 52 such that the lip 36 on the first tubular member 2 passes the plane of the conveyor 52 at the same time as the shoulders 38 on the sections 6a, 7a and 8a of a second tubular member 2a arrive at this point. The lip 36 on the first tubular member 2 engages on top of the shoulders 38 of the sections of the second tubular member 2a. As the drive pinion 56 continues to drive the first tubular member 2 downwardly, it will start to draw the sections 6a, 7a and 8a downwardly as well. This causes these sections to start to straighten up and be brought together as the sections rotate from their tilted to a vertical orientation. Eventually, this continuing downward movement causes the sections 6a, 7a and 8a to snap together with their lugs 22–24 interengaging in a snap fit. The drive pinion 56 then becomes engaged with the rack 58 on the second tubular member 2a to start driving that tubular member downwardly as well. As the top of the second tubular member 2a reaches or approaches the plane of the conveyors 52, the sections 6b, 7b and 8b for the third tubular member 2b are approaching the assembly point. These sections will become engaged with the second tubular member 2a in a generally identical manner. This process will then be repeated for as many times as desired to couple as many tubular members 2 into the pipe as are needed.

Thus, the present invention has many advantages in any type of installation where an elongated sectional pipe is required. A sectional pipe of any desired length may be easily formed by snapping together the sections 6–8 of consecutive tubular members 2 and coupling those members together in an end-to-end relationship by virtue of the lips 36 and shoulders 38. In fact, the act of longitudinally moving the pipe 50 away from the assembly point also serves as the force which causes the unassembled sections of an adjacent tubular member to straighten up and lock together after those sections have been loosely coupled to one of the assembled tubular members. Since the individual sections of the tubular members can be made quite small in length, the disadvantage of prior art sectional pipes in which relatively long pipe sections are required have been obviated. For example, the sections 6–8 are relatively easy to handle and store because of their small length.

As well as assembling a sectional pipe 50 from a plurality of tubular elements 2, the present invention also envisions an apparatus for and a method of disassembling the pipe 50. For example, assuming an elongated sectional pipe 50 has been formed from plural tubular members 2, it would conceivably be necessary to disassemble the pipe after it is no longer needed. This disassembly can be accomplished by reconverting the tubular members 2 into their separate sections 6–8 and then storing sections 6–8 for reuse.

An apparatus and method for disassembling a sectional pipe 50 would include the basic apparatus of FIG. 2, used in the assembly of pipe 50 plus the addition of a disassembly tool generally indicated as 60 in FIGS. 6 and 7. The disassembly tool is indicated in phantom in FIG. 2 in a preferred position located above the sectional pipe 50. The tool 60 includes a circular head or plug 62 and three upwardly extending tapered wedges 64. The number of wedges 64 corresponds to the number of sections which comprise the tubular member 2. For instance, when three sections 6–8 make up the tubular member, then three wedges 64 are used in the disassembly tool 60. The disassembly tool 60 is located above the plane of the conveyors 52 by a distance which is approximately equal to the length of one of the tubular members 2. In addition, when the apparatus of FIG. 2 is used as a disassembling apparatus, the pinion 56 and belt conveyors 52 are run in a reverse direction from the directions in which they are run when used to assemble a pipe. That is, the pinion 56 causes the pipe 50 to be elevated towards the disassembly tool 60, and the belt conveyors 52 are operated so as to move the sections 6–8 contained thereon away from the tool 60.

As pipe 50 is moved upwardly by pinion 56 towards the disassembly tool 60, the uppermost tubular member 2 will eventually engage the tool 60. When this occurs, the circular plug 62 on the tip of the tool 60 is received in the chamber 30 in the top surface 10 of the tubular member. However, the plug 62 is less deep than the chamber 30 so that the lower ends of wedges 64 also engage against the top portion of the axial surface 20 of each of the sections 6-8. As the pinion 56 continues to urge the tubular member against the tool 60, the increasing taper of the wedges 64 exerts a progressively increasing cam type force against the top of the sections 6-8. This force eventually becomes so great so as to cause the snap fit between the lugs 22-24 to be overcome. The sections 6-8 which make up the tubular member then fall apart. As the sections 6-8 fall apart, they will be directed by the wedges of the tool 60 backwardly so that the sections respectively fall onto one of the conveyor belts 52. These belts are being driven in a reverse direction to carry the sections away from the point of disassembly. After the pipe 50 is completely disassembled, the sections 6-8 may be sortably stored until they are needed to reassemble the pipe.

As noted previously, the curvature of the locking surfaces 26 and 28 on lugs 22-24 progressively decreases as one goes toward the top of each section 6-8. Thus, the top lugs 22 have relatively less lateral holding force developed therebetween as compared to the holding force developed between the middle and lower lugs 23 and 24. Under extreme conditions of use, it might be necessary that the holding power between the top lugs 22 be increased. One way of accomplishing such an increase in the holding power is illustrated in FIGS. 3 and 6. A small knob or protrusion 70 is formed on locking surface 26 of the two upper lugs 22 and the uppermost middle lug 23. A correspondingly sized cavity or recess 72 is located in the lower surface 28 of each of the top lugs 22. The recess 72 is sized to receive the protrusion 70 in a snap fit. Thus, when the lugs 22-24 snap together, the protrusions 70 also enter the recesses 72 to further increase the lateral holding force developed between the upper lugs 22. It may not be always necessary to use this additional means for increasing the holding power, but it should be used whenever there is any question about the locking ability of the upper locking lugs 22.

Other ways of increasing the holding power between the top lugs 22 are envisioned. For example, the axial surface 20 and the locking lugs 22-24 of each of the sections 6-8 could be made from a metallic or other magnetizable material. One of the sections 6-8 could include in its conduit 32 a permanent magnet (not shown) connected to the axial surface 20. When the sections 68 are snapped together, the magnetic field of the magnet will be conducted to the axial surfaces 20 and lugs 22-24 to provide an auxiliary means of holding the lugs in an engaged position. Instead of a permanent magnet, an electromagnet (not shown) could be used in one conduit 32 in contact with the axial surface 20. In this latter event, the windings of the electromagnet could be connected to a longitudinal metallic strip located in the periphery of that section which contains the electromagnet. As the sections 6-8 are assembled, a shoe (not shown) or other distribution means connected to a source of electrical power could contact the metallic strip in the periphery of the section to energize the electromagnet. This would create a magnetic field in the armature of the electromagnet which field could be conducted to the axial surface 20 by attaching the armature to that surface. An electromagnet could be used in each tubular member 2 in pipe 50. These electromagnets could be connected together in series when the tubular members 2 are connected together end to end. In other words, as each new tubular member is formed by snapping the sections 6-8 together, the electromagnet formed as the conduit 32 in one of the sections 6-8 would become joined in series with all of the electromagnets contained in the previously joined tubular members 2. The electrical power could be fed to the topmost tubular member by virtue of the shoe as noted previously with that power then being conducted to all the joined electromagnets.

The tubular members 2 of the present invention also are advantageous by reason of the conduits 32. When the tubular members 2 are joined together end to end, these conduits are also connected together by virtue of nipple members 33 and 34 to define longtiudinally extending passageways in sectional pipe 50. These passageways could serve as housings for electrical distribution lines or as conduits for the passage of water or other flowable materials. In addition, one of the conduits 32 of each tubular member 2 could have the nipple members 33 and 34 formed as inter-engaging electrical coupling members. Thus, when the nipple members 33 and 34 are engaged together, an electrical conductor will be formed by this conduit extending down through the length of the tubular members 2.

One possible application for a sectional pipe 50 as disclosed herein could be in the oil well drilling industry. In this industry, it is necessary to line a well bore with a drill string or drill casing. The sectional pipe 50 can function as this casing. Referring to FIGS. 1 and 2, the first tubular member 2 could be specially fabricated to include an electric motor that rotates a drill bit to drill the well bore. One of the conduits 32 could be formed as an electrical conductor attached to the motor for conducting electric power from ground level to the motor as the pipe 50 proceeds downwardly. In any event, the drill bit would rotate to drill the well bore and the pipe 50 would follow the drill bit downwardly to line the bore with additional tubular sections 2 being snapped together and connected end-to-end in the manner disclosed in FIGS. 1 and 2. The other two conduits 32 could form fluid flow passageways used for conventional purposes in the oil well drilling industry. For example, one conduit 32 could serve as a path for pumping a fluid down into the well to lubricate the drill bit and remove the fragments of tailings broken off by the bit. The other conduit 32 would then serve as a return passageway to the surface through which the lubricating fluid, the drill tailings, and any other foreign matter encountered in the well bore, such as natural gas pockets, would flow under pressure.

The advantages of a sectional pipe 50 as disclosed herein in a field such as oil well drilling are apparent. Instead of having to handle a plurality of long and heavy pipe sections, the present invention would allow a drill casing or housing to be formed from a plurality of relatively short tubular members 2. In addition, these tubular members are themselves disassemblies one by one so as to be easily handled and stored. Thus, the driller would not be presented with the problem of handling pipe sections which are many feet in length, but could instead utilize a relatively compact belt conveyor system to transport the sections 6-8 to an assembly point. All that would be required would be that the sections 6–8 be properly segregated on the conveyors 52 so that all the sections on any one conveyor are identical.

While the invention has been illustrated and described for use in the oil well industry, it could also be used in other areas where elongated pipes or booms are used. For example, a sectional pipe 50 created by the tubular members 2 of this invention could be used to form an extensible or retractable boom for use in applications where such booms have conventionally been used. For example, the boom formed from the pipe 50 could be used to support a basket or other support platform on which a person would be supported and raised to an elevated height. This could be accomplished simply by forming the first tubular member 2 with an integral platform or basket attached thereto. In this type of installation, the tubular members 2 would be driven upwardly by pinion 56 as they are assembled together, rather than being driven downwardly in the case of an oil well. This allows the basket of the first tubular member 2 to be progressively elevated to any desired height depending upon how many tubular members 2 are connected together. Suitable support structure could be used for guiding the tubular members 2 as they are elevated upwardly. Conversely, in disassembling a boom of this type, the boom would be driven downardly against the disassembly tool, 6 rather than upwardly. This invention also has utility in any other area where conventional pipes are needed.

The choice of materials used to construct the sections 6–8 could obviously vary according to the type of use that the tubular members 2 and the pipe forming from such tubular members are to be put. In high performance applications where extreme stresses and force will be encountered by the tubular members 2, they obviously should be constructed of durable materials such as high strength steel. In other situations where the pipe 50 is merely to serve as a conduit for a flowing liquid, less strong materials such as plastic could be used in the construction of the sections 6–8. Various other modifications of this invention will be apparent to those skilled in the art. Thus, the scope of this invention is to be limited only by the appended claims.

I claim:

1. A tubular member which is elongated along a longitudinal axis extending therethrough and which is made from a plurality of sections, wherein each section has a transverse cross-sectional configuration which includes a radially outward circumferential surface that defines part of the exterior of the tubular member and two generally radially extending side surfaces which converge from the radially outward circumferential surface to a radially inward circumferential surface that extends parallel to the longitudinal axis, and further including a plurality of longitudinally spaced lugs, one of said lugs located on the radially inward circumferential surface of each secton, wherein the lugs on adjacent sections are colinear with and longitudinally staggered relative to one another to interfit with one another to lock the plural sections together to form the tubular member and also to prevent relative longitudinal movement between the sections, wherein the lugs extend inwardly from the radially inward circumferential surfaces of their respective sections to lie generally along the longitudinal axis of the tubular member.

2. An elongated tubular member as recited in claim 1, wherein the locking means comprises means for detachably snapping the sections together.

3. An elongated tubular member as recited in claim 1, wherein the lugs are further configured to coact with one another in a snap fit to detachably interlock the sections.

4. An elongated tubular member as recited in claim 3, wherein the lugs have axial ends which are curved and which form locking surfaces, wherein the locking surfaces on longitudinally adjacent lugs have a matching curvature to allow the lugs to mate with one another, and wherein the curvature of the lugs is selected such that the lugs can be interfitted in a snap fit by the application of an external force and when so interfitted the curvature of the lugs prevents lateral movement between the sections during normal operation of the tubular member.

5. An elongated tubular member as recited in claim 4, wherein the locking surfaces of the lugs are the top and bottom surfaces of the lugs, and wherein the top surfaces have a convex configuration and the bottom surfaces have a concave configuration.

6. An elongated tubular member as recited in claim 4, wherein the curvature of the locking surfaces on the locking lugs progressively increases from one end of each section to the other, such that the lugs on the sections are progressively snapped together beginning at the one end of the section and progressing towards the other end of the section.

7. An elongated tubular member as recited in claim 6, wherein each lug having the smallest curvature on each of the sections is provided with means in addition to its curvature for increasing the force of its snap fit with the longitudinally adjacent lugs.

8. An elongated tubular member as recited in claim 1, further including means located on opposed ends of each section for respectively coupling a first tubular member to a second tubular member in an end-to-end manner.

9. An elongated tubular member as recited in claim 8, wherein the coupling means comprises an inwardly turned shoulder at one end of each section and an outwardly turned lip at the other end of each section, wherein the lip is configured to engage and mate with the shoulder to releasably connect together longitudinally adjacent tubular members.

10. An elongated tubular member as recited in claims 4 or 9, wherein at least one section which forms the tubular member includes a longitudinally extending conduit which is open on opposed ends of the section, and wherein the conduit is configured to align and mate with a similar conduit in the corresponding section of an adjacent tubular member when a plurality of tubular members are placed end-to-end.

11. An elongated tubular member as recited in claim 10, further including means located on opposed ends of the conduit which means are suited for respectively coupling the conduit to a similar conduit in a longitudinally adjacent tubular member.

12. An elongated tubular member as recited in claim 11, wherein the conduit coupling means comprises one end of the conduit being sized to fit inside the other end of the conduit in a press fit such that the conduits in longitudinally adjacent tubular members may be physically joined.

13. An elongated tubular member as recited in claim 10, wherein each section of the tubular member includes a longitudinally extending conduit which is open on opposed ends of the section.

14. An elongated sectional pipe comprising a plurality of the tubular members of claim 1 inter-connected in and end-to-end relationship.

15. An elongated sectional pipe as recited in claim 14, wherein at least one of the sections of each tubular member includes means suitable for coacting with a drive motor for moving the pipe in a longitudinal direction.

16. An elongated sectional pipe as recited in claim 15, wherein the coacting means comprises a toothed rack which is adapted to coact with a toothed pinion on the drive motor.

* * * * *